United States Patent
Nishi et al.

(10) Patent No.: US 7,626,601 B2
(45) Date of Patent: Dec. 1, 2009

(54) VIDEO SIGNAL PROCESSING APPARATUS AND VIDEO SIGNAL PROCESSING METHOD

(75) Inventors: Toru Nishi, Tokyo (JP); Mitsuyasu Asano, Tokyo (JP); Kazuhiko Ueda, Kanagawa (JP); Masuyoshi Kurokawa, Kanagawa (JP); Kazuhiko Nishibori, Kanagawa (JP)

(73) Assignee: Sony Corporation, Tokyo (JP)

( * ) Notice: Subject to any disclaimer, the term of this patent is extended or adjusted under 35 U.S.C. 154(b) by 574 days.

(21) Appl. No.: 11/481,063

(22) Filed: Jul. 6, 2006

(65) Prior Publication Data
US 2007/0008348 A1 Jan. 11, 2007

(30) Foreign Application Priority Data
Jul. 11, 2005 (JP) ............................ P2005-201107

(51) Int. Cl.
*H04N 7/01* (2006.01)
*G09G 5/02* (2006.01)
(52) U.S. Cl. ............... 345/698; 345/699; 348/441; 348/459
(58) Field of Classification Search ......... 345/545–546, 345/99, 204, 212, 213, 698, 699; 348/441–459
See application file for complete search history.

(56) References Cited
U.S. PATENT DOCUMENTS

| | | | |
|---|---|---|---|
| 6,144,412 A | 11/2000 | Hirano et al. | |
| 6,181,382 B1 * | 1/2001 | Kieu et al. | 348/459 |
| 6,593,939 B2 * | 7/2003 | Yamada et al. | 345/546 |
| 2002/0113780 A1 * | 8/2002 | Narui | 345/204 |
| 2004/0101058 A1 * | 5/2004 | Sasai et al. | 375/240.26 |
| 2005/0036055 A1 | 2/2005 | Nakasuji et al. | |
| 2005/0078069 A1 * | 4/2005 | Aiba et al. | 345/87 |
| 2005/0184949 A1 * | 8/2005 | Kamimura | 345/98 |
| 2009/0073311 A1 * | 3/2009 | Hamada et al. | 348/441 |

FOREIGN PATENT DOCUMENTS

| | | |
|---|---|---|
| EP | 0 837 601 A2 | 4/1998 |
| JP | 2002-104095 | 4/2002 |
| JP | 2002-222634 | 8/2002 |
| JP | 2003-299039 | 10/2003 |

* cited by examiner

*Primary Examiner*—David L Lewis
(74) *Attorney, Agent, or Firm*—Finnegan, Henderson, Farabow, Garrett & Dunner, L.L.P.

(57) ABSTRACT

A video signal processing apparatus for outputting an output video signal to a display unit and displaying an image based on an input video signal on the display unit includes a signal processor for dividing the input video signal into a predetermined number of signals and outputting the signals as the output video signal. The signals as the output video signal drive associated areas obtained by dividing a display-capable area of the display unit. In accordance with the display unit, the predetermined number of signals is set so that the clock frequency of each of the signals output as the output video signal is less than or equal to a clock frequency that can be processed by the display unit.

8 Claims, 8 Drawing Sheets

VIDEO SIGNAL PROCESSING APPARATUS AND VIDEO SIGNAL PROCESSING METHOD

CROSS REFERENCES TO RELATED APPLICATIONS

The present invention contains subject matter related to Japanese Patent Application JP 2005-201107 filed in the Japanese Patent Office on Jul. 11, 2005, the entire contents of which are incorporated herein by reference.

BACKGROUND OF THE INVENTION

1. Field of the Invention

The present invention relates to video signal processing apparatuses and video signal processing methods and is applicable to, for example, generation of drive signals for liquid crystal display panels. The present invention enables display of video signals with a high resolution in accordance with various characteristics of display apparatuses by setting the number of signals to be output as an output video signal in accordance with a display unit so that the clock frequency of each signal is less than or equal to a clock frequency that can be processed by the display unit, dividing an input video signal into the set number of signals to be output as the output video signal, and driving areas of the display unit using the associated signals as the output video signal.

2. Description of the Related Art

In format conversion of video signals, the frame rate has been increased or decreased using an upconverter or a downconverter, respectively, in order to enhance the image quality. Various schemes for signal processing using such an upconverter have been proposed in, for example, Japanese Patent Application No. 2002-104095.

In addition, a method for preventing tearing in displaying a moving image on a large screen using a plurality of liquid crystal display panels is proposed in Japanese Unexamined Patent Application Publication No. 2002-222634.

It is conceivable that, in the future, video-signal display apparatuses with variously different characteristics will be produced. Accordingly, in the field of video signal processing, it becomes desirable that video signals be displayed with a high resolution in accordance with various characteristics of these display apparatuses.

SUMMARY OF THE INVENTION

The present invention has been made in view of the above-described circumstances and it is desirable to provide a video signal processing apparatus and a video signal processing method for displaying a video signal with a high resolution in accordance with various characteristics of display apparatuses.

According to an embodiment of the present invention, there is provided a video signal processing apparatus for outputting an output video signal to a display unit and displaying an image based on an input video signal on the display unit. The video signal processing apparatus includes a signal processor for dividing the input video signal into a predetermined number of signals and outputting the signals as the output video signal. The signals as the output video signal drive associated areas obtained by dividing a display-capable area of the display unit. In accordance with the display unit, the predetermined number of signals is set so that the clock frequency of each of the signals output as the output video signal is less than or equal to a clock frequency that can be processed by the display unit.

According to another embodiment of the present invention, there is provided a video signal processing method for outputting an output video signal to a display unit and displaying an image based on an input video signal on the display unit. The video image processing method includes the following steps: setting, in accordance with the display unit, the number of signals to be output as the output video signal so that the clock frequency of each of the signals output as the output video signal is less than or equal to a clock frequency that can be processed by the display unit; dividing the input video signal into the set number of signals and outputting the signals as the output video signal; and driving, using the signals as the output video signal, associated areas obtained by dividing a display-capable area of the display unit.

According to the aforementioned video signal processing apparatus, an image with a high frame frequency can be displayed on a display unit with a low operating speed. Accordingly, a video signal can be displayed with a high resolution in accordance with various characteristics of display apparatuses.

According to the aforementioned video signal processing method, a video signal can be displayed with a high resolution in accordance with various characteristics of display apparatuses.

According to the embodiments of the present invention, a video signal can be displayed with a high resolution in accordance with various characteristics of display apparatuses.

DESCRIPTION OF THE PREFERRED EMBODIMENTS

Embodiments of the present invention will be described with reference to the accompanying drawings.

(1) Configuration of First Embodiment

Figure 1:
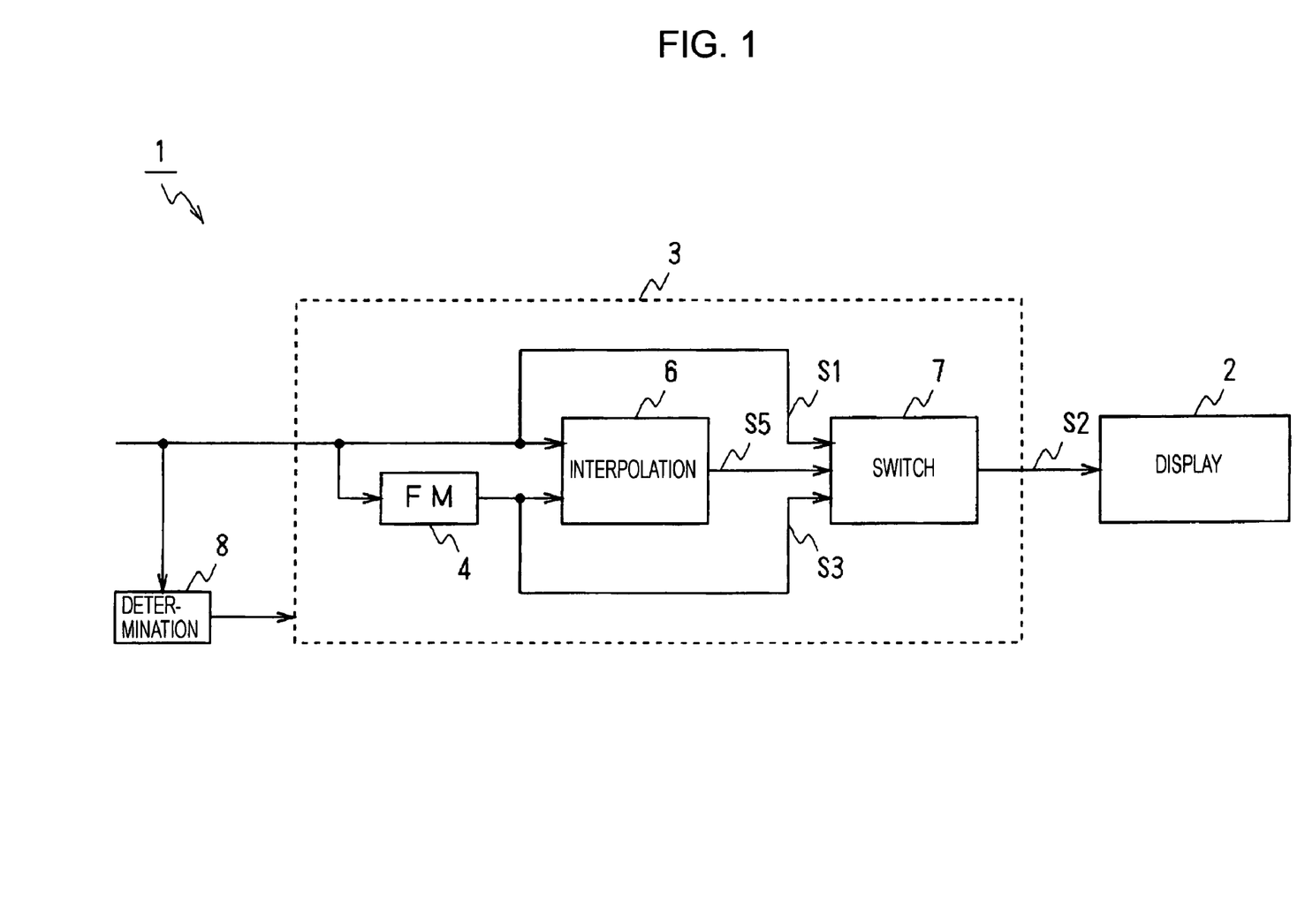
FIG. 1 is a block diagram of a video signal processing apparatus according to a first embodiment of the present invention.

FIG. 1 is a block diagram of a video signal processing apparatus according to a first embodiment of the present invention. A video signal processing apparatus 1 displays an image of an input video signal S1 output from various sources including a tuner, a game machine, and a digital versatile disk (DVD) player. Using a selector switch, the video signal processing apparatus 1 selectively receives, from these various sources, the non-interlaced input video signal S1 with a frame frequency of 60 Hz and the non-interlaced input video signal S1 with a frame frequency of 120 Hz.

A display 2 is a liquid crystal display panel integrated with the video signal processing apparatus 1 and is a flat display capable of displaying a video signal with a frame frequency of 120 Hz. Various displays including an electro-luminescence (EL) display panel and a plasma display panel are widely applicable as the display 2.

A determination circuit 8 detects the frame frequency of the input video signal S1 on the basis of, for example, the count of sync signals included in the input video signal S1 and, on the basis of the detection result, changes the operation of a signal processing circuit 3 at a subsequent stage.

The signal processing circuit 3 includes, for example, an integrated circuit and changes the operation in accordance with the setting of the display 2 operable to perform display for the video signal processing apparatus 1 and on the basis of the determination result obtained by the determination circuit 8 and outputs a video signal S2 to the display 2.

Specifically, in the signal processing circuit 3, a frame memory (FM) 4 delays the input video signal S1 by one frame and outputs a delayed video signal S3.

On the basis of the determination result obtained by the determination circuit 8, an interpolation circuit 6 operates in response to the input video signal S1 with a frame frequency of 60 Hz. For example, the interpolation circuit 6 performs interpolation processing using the input video signal S1 and the delayed video signal S3 by applying, for example, a motion compensation technique to generate an interpolated-frame video signal S5 to be interpolated in the middle of successive frames of the input video signal S1 and outputs the interpolated-frame video signal S5.

A switching circuit 7 changes the operation on the basis of the predetermined setting and the determination result obtained by the determination circuit 8. When the display 2, to which a video signal is supplied from the signal processing circuit 3, is capable of displaying a video signal with a frame frequency of 120 Hz, and when the input video signal S1 is a video signal with a frame frequency of 120 Hz, the switching circuit 7 selects the input video signal S1 and outputs the input video signal S1 as the video signal S2. In contrast, when the input video signal S1 is a video signal with a frame frequency of 60 Hz, the switching circuit 7 compresses the input video signal S1 and the interpolated-frame video signal S5 in the time domain in units of frames, alternately selects the time-domain-compressed input video signal S1 and interpolated-frame video signal S5 in units of frames, and multiplexes the input video signal S1 and the interpolated-frame video signal S5 to output the video signal S2 with a frame frequency of 120 Hz. In this case, the switching circuit 7 serves as, together with the interpolation circuit 6, an upconverter for upconverting the frame frequency of the input video signal S1.

Figure 2:
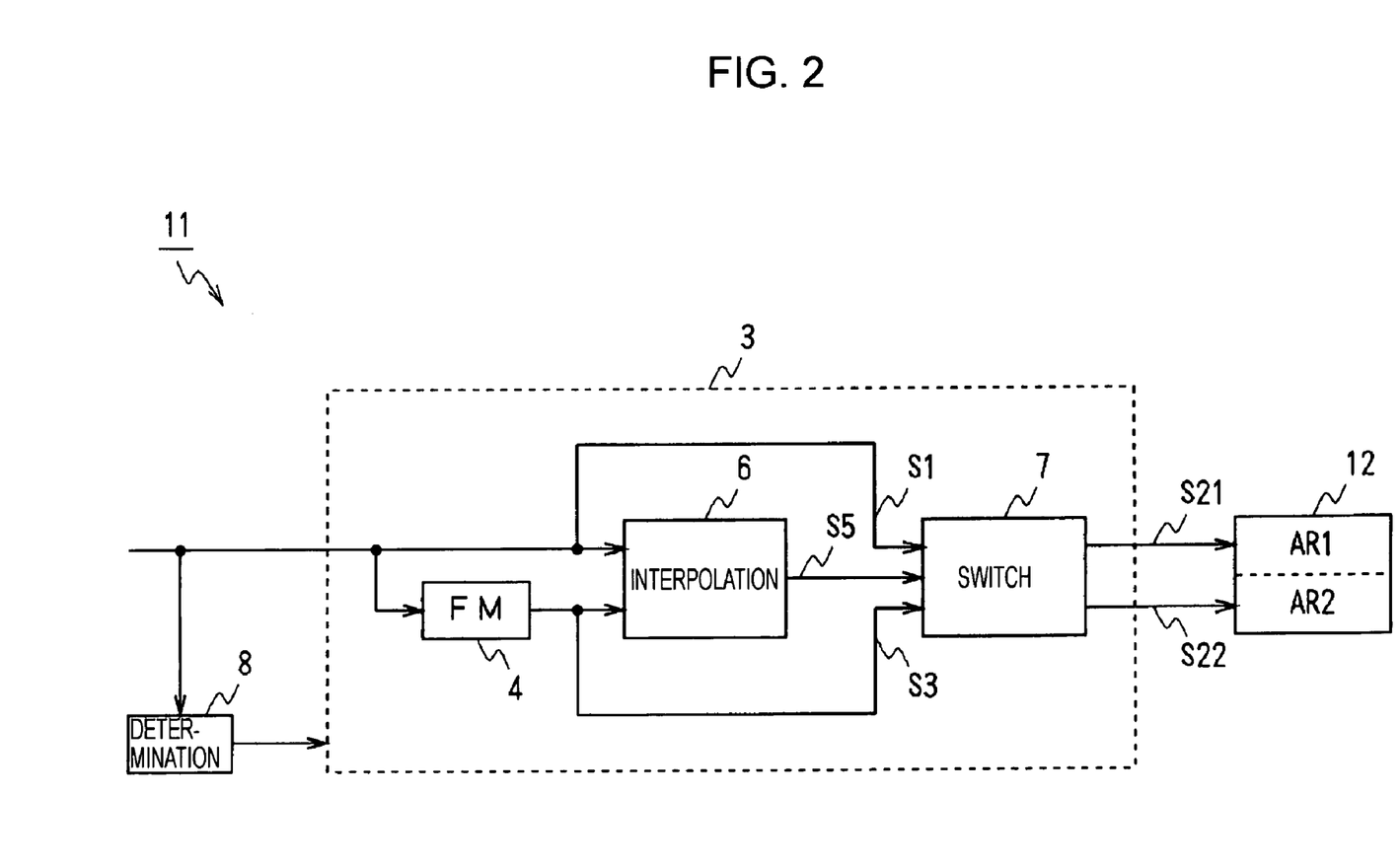
FIG. 2 is a block diagram of the case in which a different display is applied to the video signal processing apparatus shown in FIG. 1.

In contrast, a video signal processing apparatus 11 shown in FIG. 2 outputs a plurality of video signals S21 and S22 when the operating frequency of a display 12 integrated with the video signal processing apparatus 11 is low. A display area of the display 12 is virtually divided in the vertical direction into a plurality of areas in association with the output of the video signals S21 and S22. Each area is provided with a vertical drive circuit for outputting a drive signal to a signal line of each pixel and a horizontal drive circuit for selecting pixels in units of lines in association with the driving by the vertical drive circuit. The horizontal drive circuit selects pixels in each area simultaneously and in parallel. Accordingly, the display 12 operates in response to a low clock frequency and can display an image with a high frame rate. In the first embodiment, the number of division is set to the value 2. As a result, areas AR1 and AR2 at the top and the bottom in the vertical direction receive the associated video signals S21 and S22. Accordingly, even though it is difficult for the display 12 to operate at a clock frequency corresponding to the video signal S2 with a frame frequency of 120 Hz output to the display 2 and it is thus difficult for the display 12 to display the video signal S2, the display 12 can display the video signals S21 and S22 with a clock frequency half the clock frequency of the video signal S2.

Accordingly, the signal processing circuit 3 changes the number of signals to be output as the video signal to the displays 2 and 12 in accordance with the displays 2 and 12 operable to output the video signal so that the clock frequency of each of the signals output as the video signal is less than or equal to a clock frequency that can be processed by the displays 2 and 12.

Figure 3:
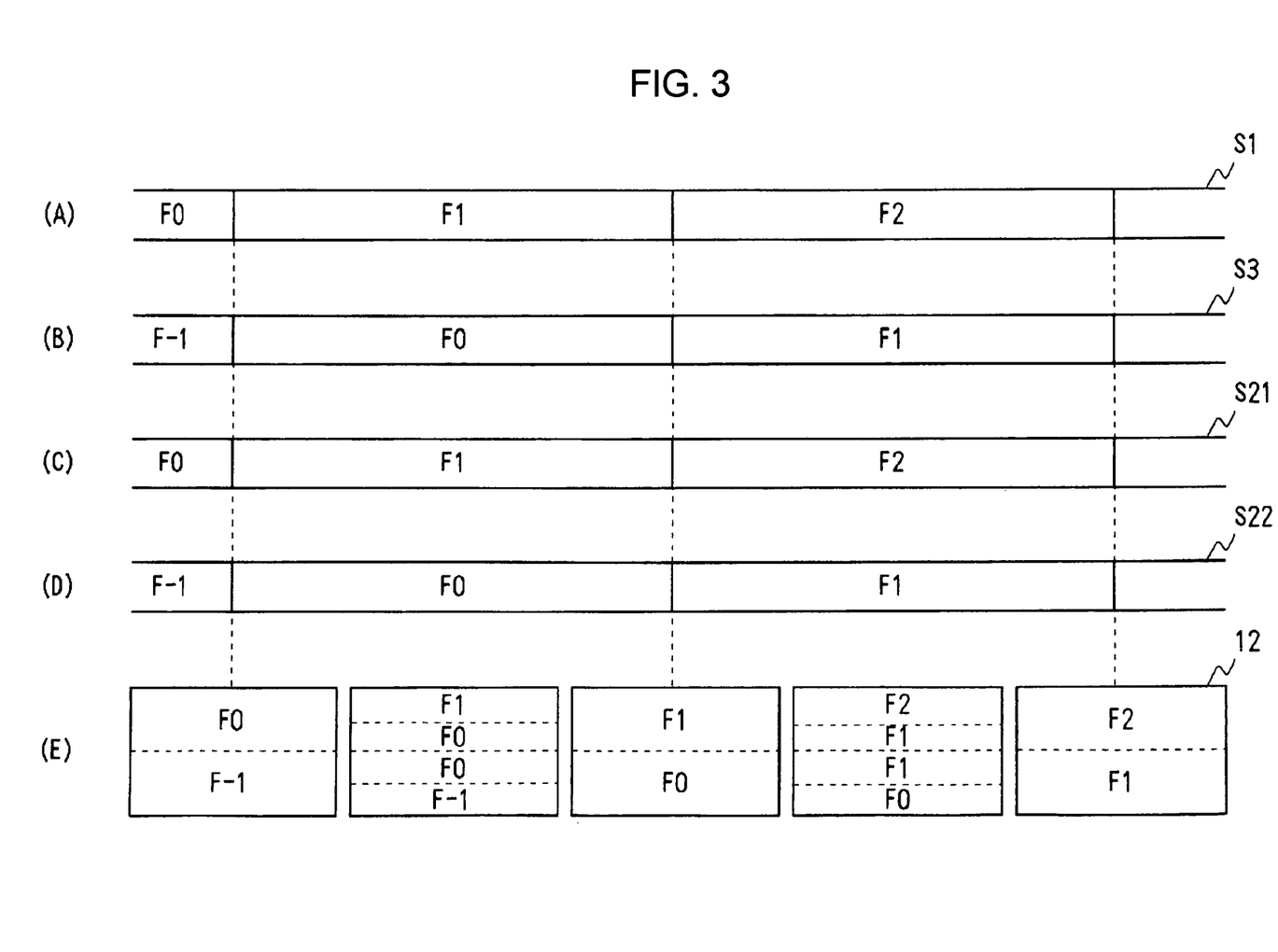
FIG. 3 is a timing chart of the case in which the video signal processing apparatus shown in FIG. 2 processes an input video signal with a frame frequency of 120 Hz.

In the case where the two video signals S21 and S22 are output and the frame frequency of the input video signal S1 is 120 Hz, as shown in FIG. 3, the switching circuit 7 selects, from the input image signal S1 (portion (A) of FIG. 3), image data corresponding to the scan start area AR1 of the display 12, extends the image data in the time domain using a memory, and outputs the extended image data as the video signal S21 (portions (C) and (E) of FIG. 3) for driving the scan start area AR1. Also, the switching circuit 7 selects, from the delayed video signal S3 (portion (B) of FIG. 3), image data corresponding to the scan end area AR2 of the display 12, extends the image data in the time domain using a memory, and outputs the extended image data as the video signal S22 (portions (D) and (E) of FIG. 3) for driving the scan end area AR2. In FIG. 3, reference numerals F-1, F0, F1, . . . denote successive frames, and portion (E) shows frames displayed at each point on the display screen of the display 12.

The scan start area AR1 and the scan end area AR2 of the display 12 can display the same frame, having the boundary between the areas AR1 and AR2 therebetween, thereby preventing discontinuity of an image at the boundary.

Figure 4:
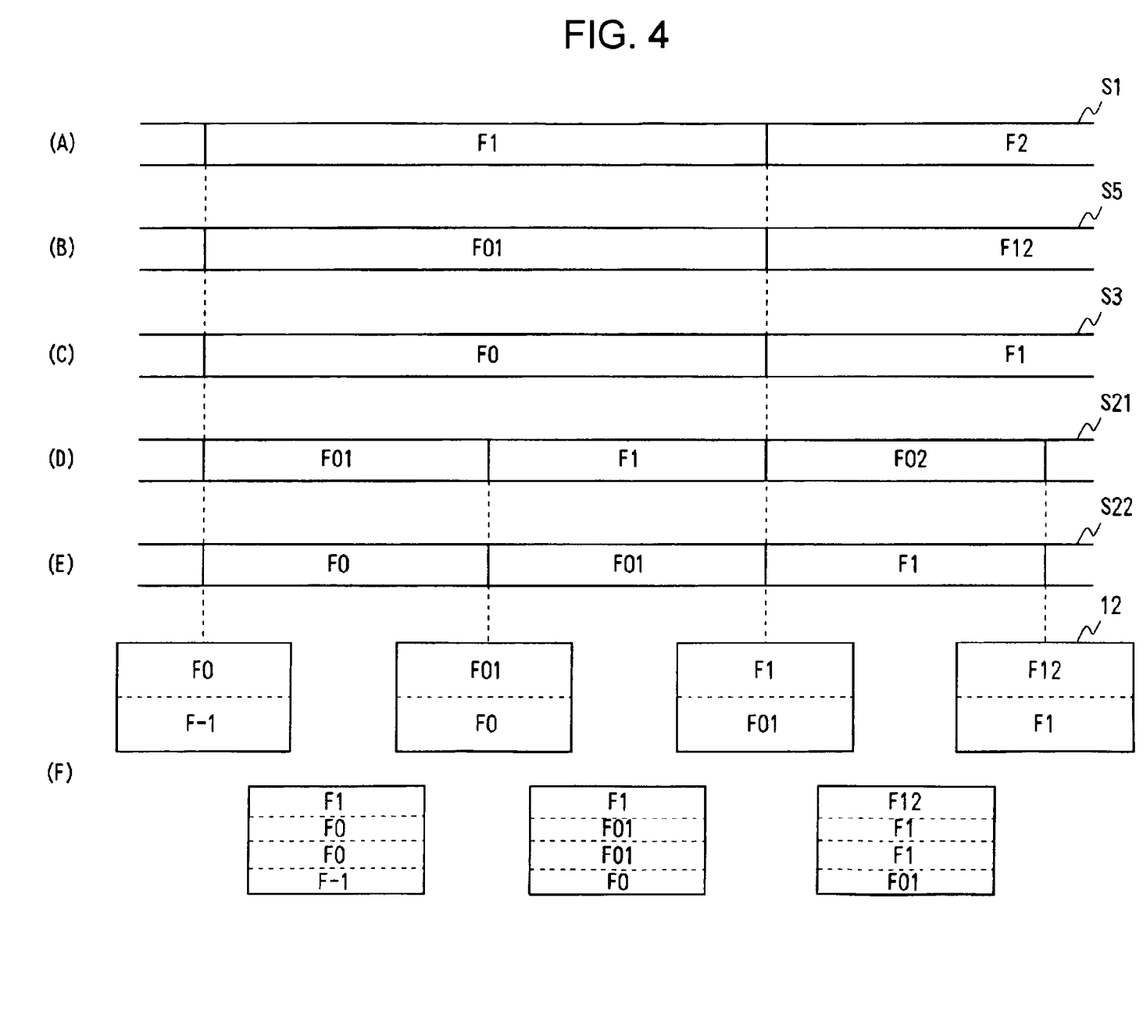
FIG. 4 is a timing chart of the case in which the video signal processing apparatus shown in FIG. 2 processes an input video signal with a frame frequency of 60 Hz.

In contrast, in the case where the frame frequency of the input video signal S1 is 60 Hz, referring to FIG. 4, as in contrast to FIG. 3, the switching circuit 7 alternately selects, from the input video signal S1 and the interpolated-frame video signal S5 (portions (A) and (B) of FIG. 4), image data corresponding to the scan start area AR1 of the display 12 and outputs the selected image data as the video signal S21 (portions (D) and (F) of FIG. 4) for driving the scan start area AR1. Frame F01 is a frame interpolated between frames F0 and F1 of the input video signal S1. Also, the switching circuit 7 alternately selects, from the interpolated-frame video signal S5 and the delayed video signal S3 (portions (B) and (C) of FIG. 4), image data corresponding to the scan end area AR2 of the display 12 and outputs the selected image data as the video signal S22 (portions (E) and (F) of FIG. 4) for driving the scan end area AR2.

Accordingly, also in this case, the scan start area AR1 and the scan end area AR2 of the display 12 can display the same frame, having the boundary between the areas AR1 and AR2 therebetween, thereby preventing discontinuity of an image at the boundary.

(2) Operation of First Embodiment

With the above-described configuration, in the video signal processing apparatus 1 according to the first embodiment (FIGS. 1 and 2), the input video signal S1 selected by changing the source is input to the signal processing circuit 3. In response to the input video signal S1 and in accordance with the displays 2 and 12 to which the video signal is output from the signal processing circuit 3, the processing is changed and the input video signal S1 is processed, thereby enabling high-resolution display of video signals in accordance with various characteristics of display apparatuses and with various formats of video signals.

Specifically, in the case where the input video signal S1 has a frame frequency of 120 Hz (FIG. 1) and the display 2 can operate fast enough to display a video signal with this frame frequency, the signal processing circuit 3 does not process the input video signal S1 and outputs the input video signal S1 as the video signal S2 to the display 2. As a result, the input video signal S1 can be displayed with a high resolution due to a high frame rate.

In the case where the input video signal S1 has a frame frequency of 60 Hz and the display 2 can operate fast enough to display a video signal with a frame frequency of 120 Hz, the interpolation circuit 6 in the video signal processing apparatus 1 performs interpolation using the input video signal S1 and the delayed video signal S3, which is obtained by delaying the input video signal S1 by one frame, to generate the interpolated-frame video signal S5, which is to be interpolated in the middle of adjacent frames of the input video signal S1. The switching circuit 7 multiplexes the interpolated-frame video signal S5 and the input video signal S1, thereby converting the input video signal S1 into the video signal S2 with a frame frequency of 120 Hz. In the video signal processing apparatus 1, the display 2 is driven by the video signal S2. Accordingly, the video signal processing apparatus 1 makes sufficient use of the performance of the display 2 and can display an image with a high resolution based on the input video signal S1.

In contrast, in the case where the operating speed of the display 12 is low enough that it is difficult for the display 12 to display a video signal with a frame frequency of 120 Hz (FIG. 2), the display area of the display 12 is divided into areas in the vertical direction, and drive circuits of the display 12 are formed to input video signals to the associated areas and to drive the associated areas. Accordingly, the plurality of video signals S21 and S22 are output from the signal processing circuit 3 to drive the display 12.

Specifically in this case where the input video signal S1 has a frame frequency of 120 Hz (FIG. 3), the video signal processing apparatus 11 selects, from the input video signal S1, image data corresponding to the scan start area AR1 of the display 12, extends the image data in the time domain, and outputs the extended image data as the video signal S21 to the display 12. Also, the video signal processing apparatus 11 selects, from the delayed video signal S3, image data corresponding to the scan end area AR2 of the display 12, extends the image data in the time domain, and outputs the extended image data as the video signal S22 to the display 12. In contrast to the case where only one image signal S2 is input and processed, it is only necessary for the display 12 to display an image based on the video signals S21 and S22 with half the clock frequency. Accordingly, the video signal processing apparatus 11 makes sufficient use of the performance of the display 12 and can display an image with a high resolution based on the input video signal S1.

In contrast, when the input video signal S1 has a frame frequency of 60 Hz (FIG. 4), the video signal processing apparatus 11 alternately selects, from the input video signal S1 and the interpolated-frame video signal S5, image data corresponding to the scan start area AR1 of the display 12 and outputs the image data as the video signal S21 to the display 12. Also, the video signal processing apparatus 11 alternately selects, from the interpolated-frame video signal S5 and the delayed video signal S3, image data corresponding to the scan end area AR2 of the display 12 and outputs the image data as the video signal S22 to the display 12.

Accordingly, the display 12 uses the video signals S21 and S22 with a frame frequency of 60 Hz to display the input video signal S1 with a frame frequency of 120 Hz. Also in this case, the video signal processing apparatus 11 makes sufficient use of the performance of the display 12 and can display an image with a high resolution based on the input video signal S1.

With such a series of processing steps, on the basis of the input video signal S1, the interpolated-frame video signal S5, and the delayed video signal S3 each having a frame frequency of 60 Hz, the video signal processing apparatus 11 selects image data of first half portions and second half portions of the video signals S1 to S5 and outputs the selected image data as the video signals S21 and S22, thereby generating the video signals S21 and S22 on the basis of the video signals S1 to S5. By delaying and selectively outputting the to-be-processed video signals S1 to S5 so as to correspond to the output video signals S21 and S22, the video signals S21 and S22 can be generated. Accordingly, the video signals S21 and S22 can be generated by the simple configuration. Actually, such video signals can be delayed using a time-domain-extension memory for processing video signals with a frame frequency of 120 Hz. As a result, the configuration for processing video signals with a frame frequency of 120 Hz can be effectively used, and the display 12 with a low operating speed can display an image with a frame frequency increased by the simple processing.

(3) Advantages of First Embodiment

With the above-described configuration, in accordance with a display serving as a display unit, the number of signals to be output as the output video signal is set so that the clock frequency of each signal is less than or equal to a clock frequency that can be processed by the display unit, and the input video signal is divided into the set number of signals to be output as the output video signal. Using the signals as the output video signal, associated areas of the display-capable area of the display unit are driven, thereby displaying a video signal with a high resolution in accordance with various characteristics of display apparatuses.

The display screen is divided into areas in the vertical direction. A video signal corresponding to the scan start area AR1 is selected alternately from the input video signal and the interpolated-frame video signal, and the selected video signal is output as the output video signal S21. A video signal corresponding to the scan end area AR2 of the display unit is selected alternately from the interpolated-frame video signal and the delayed video signal, and the selected video signal is output as the output video signal S22. Accordingly, discontinuity of an image at the area boundary is effectively avoided, and a low-frame-rate input video signal can be displayed with a high resolution.

By selecting, from the input video signal and the delayed video signal, video signals corresponding to the scan start area AR1 and the scan end area AR2 of the display unit, by extending the selected video signals in the time domain, and by outputting the extended signals as video signals corresponding to the associated areas, discontinuity of an image at the area boundary is effectively avoided, and a low-frame-rate input video signal is displayed with a high resolution.

Second Embodiment

Figure 5:
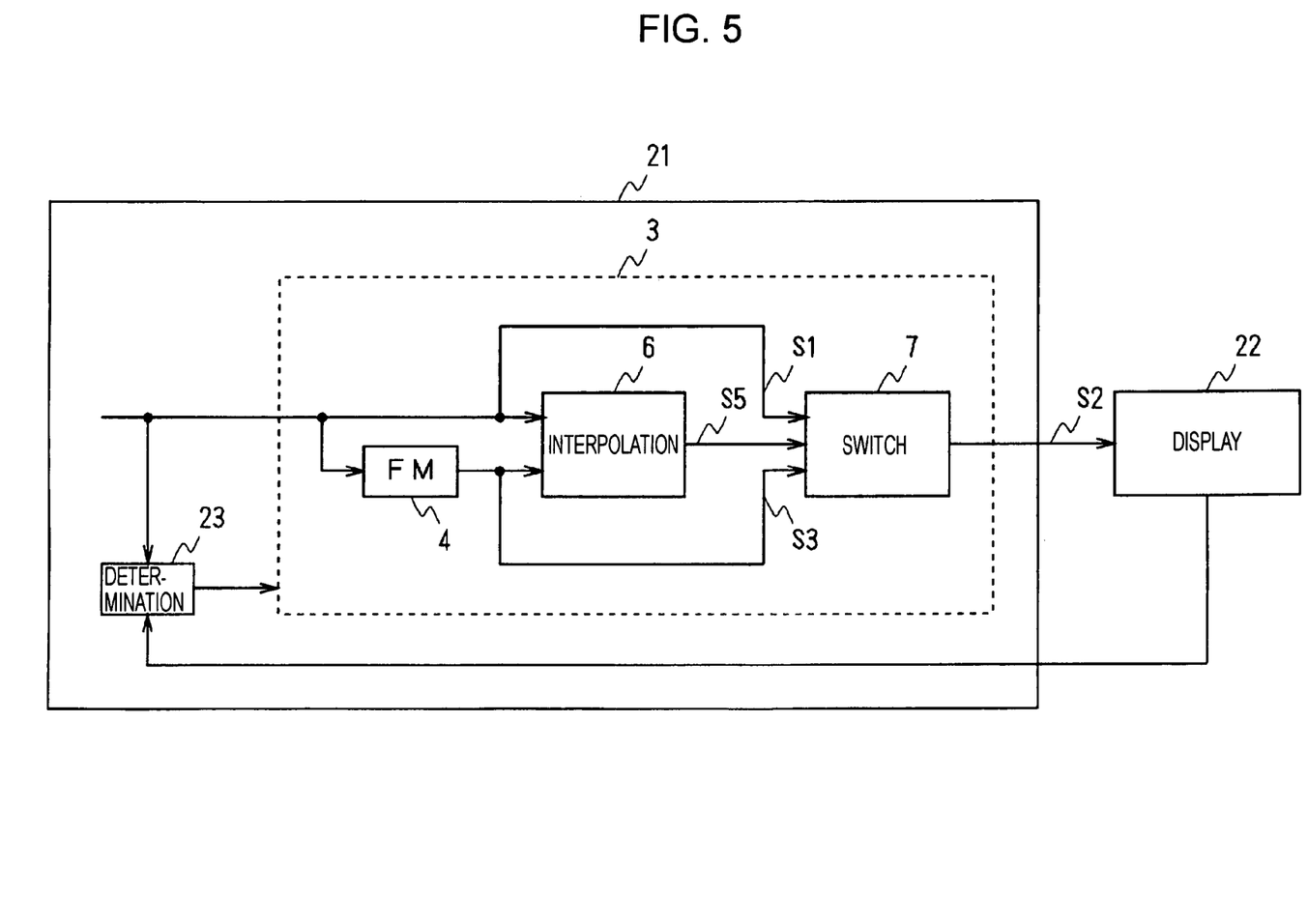
FIG. 5 is a block diagram of a video signal processing apparatus according to a second embodiment of the present invention.

FIG. 5 is a block diagram of a video signal processing apparatus according to a second embodiment of the present invention. A video signal processing apparatus 21 is separate but connectable to a desired display 22. When connected to the display 22 via an interface for outputting a video signal to the display 22, the video signal processing apparatus 21 determines, using a determination circuit 23, an interface of the display 22 for receiving video signals. The determination of the interface for receiving video signals is the determination of number of signals, which has been described with reference to FIGS. 1 and 2, and can be performed by, for example, detecting the identification code set in the display 22.

In accordance with the determination by the determination circuit 23, as has been described with reference to FIGS. 1 and 2, the video signal processing apparatus 21 changes the number of signals to be output as the video signal to the display 21 and outputs the video signal with a frame frequency of 120 Hz. Alternatively, such determination by the determination circuit 23 may be performed by detecting the user setting.

Even in the case where, as in the second embodiment, the video signal processing apparatus is separate from the display, similar advantages as those achieved by the first embodiment can be achieved.

Third Embodiment

In a third embodiment, a plurality of signals as the video signal S2 with a frame frequency of 120 Hz, which has been described in the first embodiment, and the video signal S2 with a frame frequency of 60 Hz are selectively output in response to a user operation. A video signal processing apparatus according to the third embodiment has the same configuration as that of the above-described video signal processing apparatus 11 according to the first embodiment except for the configuration for changing the number of output signals. The operation of a display of the video signal processing apparatus according to the third embodiment is switched by a vertical drive circuit for outputting drive signals to signal lines in response to control by a controller. In a first operation mode, the display of the third embodiment displays the single video signal S2 with a frame frequency of 60 Hz, as in the above-described display 2 shown in FIG. 1. In a second operation mode, the display of the third embodiment displays the two video signals S21 and S22 as a video signal with a frame frequency of 120 Hz, as in the above-described display 12 shown in FIG. 2.

Specifically, in the case where the video signals S21 and S22 as a video signal with a frame frequency of 120 Hz are displayed, a moving image with a smooth motion can be displayed. However, a somewhat jagged motion rather than such a smooth motion may be preferred depending on the source. In particular, in the case of a motion picture, frame-by-frame display using a single video signal with a frame frequency of 60 Hz creates an atmosphere as if one is watching a moving image in a movie theater.

In the third embodiment, an image with a smooth motion and an image with a jagged motion are selectively displayed in accordance with user's preferences and tastes, thereby achieving similar advantages as those achieved in the first embodiment.

Fourth Embodiment

The case where discontinuity of a motion at the boundary between the areas AR1 and AR2 is avoided by displaying moving images based on the above-described video signals S21 and S22, as in the second embodiment, corresponds to the case where an object crosses the boundary. When an object moves in places other than the boundary, such discontinuity of a motion at the boundary does not occur.

In a fourth embodiment, the presence of motion at the boundary is determined, and the output of the two video signals S21 and S22 is switched. A video signal processing apparatus according to the fourth embodiment has the same configuration as that of the above-described video signal processing apparatus 11 of the second embodiment except for the configuration regarding the boundary. Therefore, the fourth embodiment will be described using the configuration shown in FIG. 2.

In the fourth embodiment, the determination circuit 8 determines the frame frequency of the input video signal S1 and detects the motion of the input video signal S1 at the boundary. That is, the determination circuit 8 calculates, in a range of a predetermined number of lines above and below the boundary, a difference value between frames on the basis of corresponding pixels in successive frames of the input video signal S1 and further calculates the sum of the absolute values of the difference values between frames in each frame. By comparing the sum of the absolute values with a predetermined threshold, the presence of motion is detected.

Figure 6:
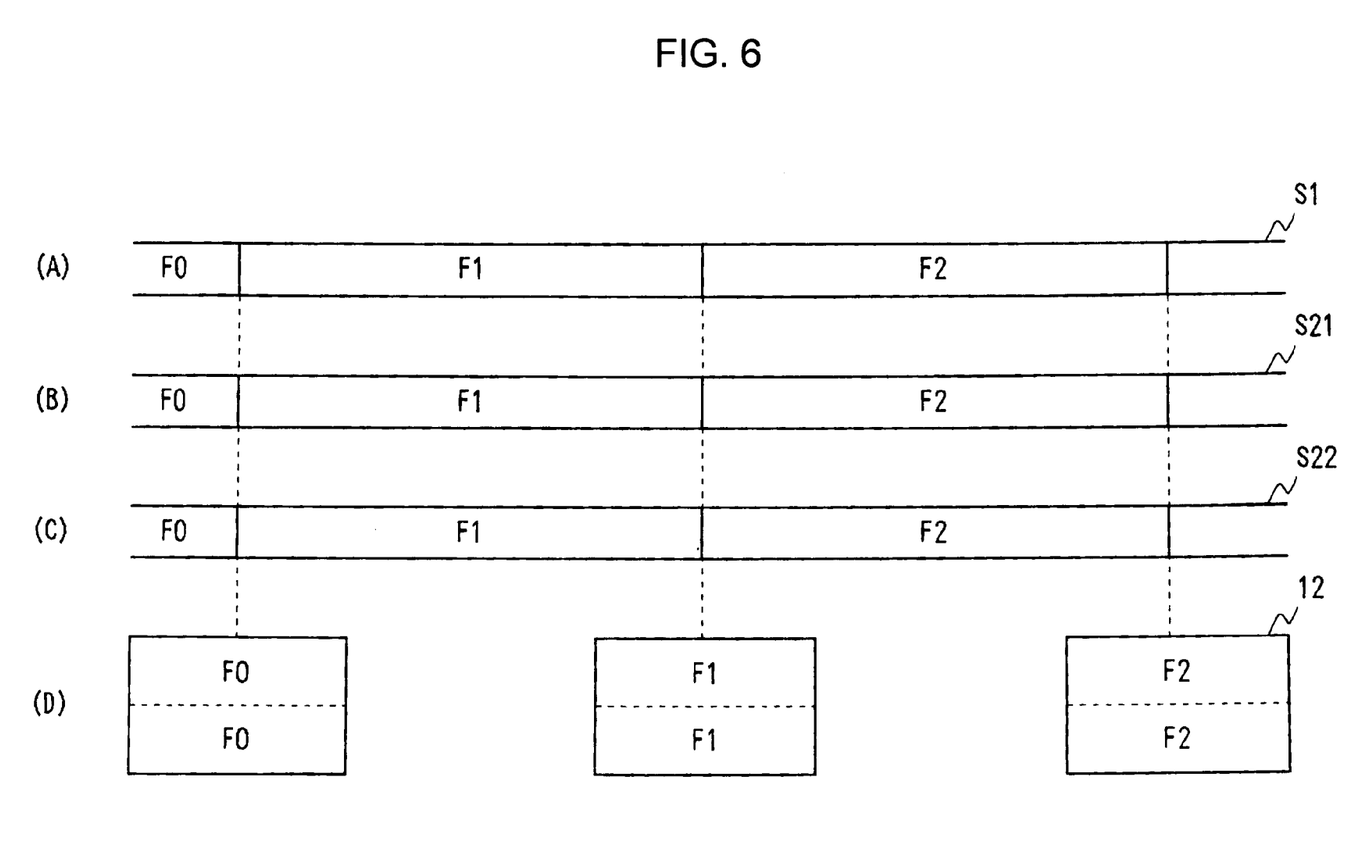
FIG. 6 is a timing chart of the case in which a video signal processing apparatus according to a fourth embodiment of the present invention processes an input video signal with a frame frequency of 120 Hz.
Figure 7:
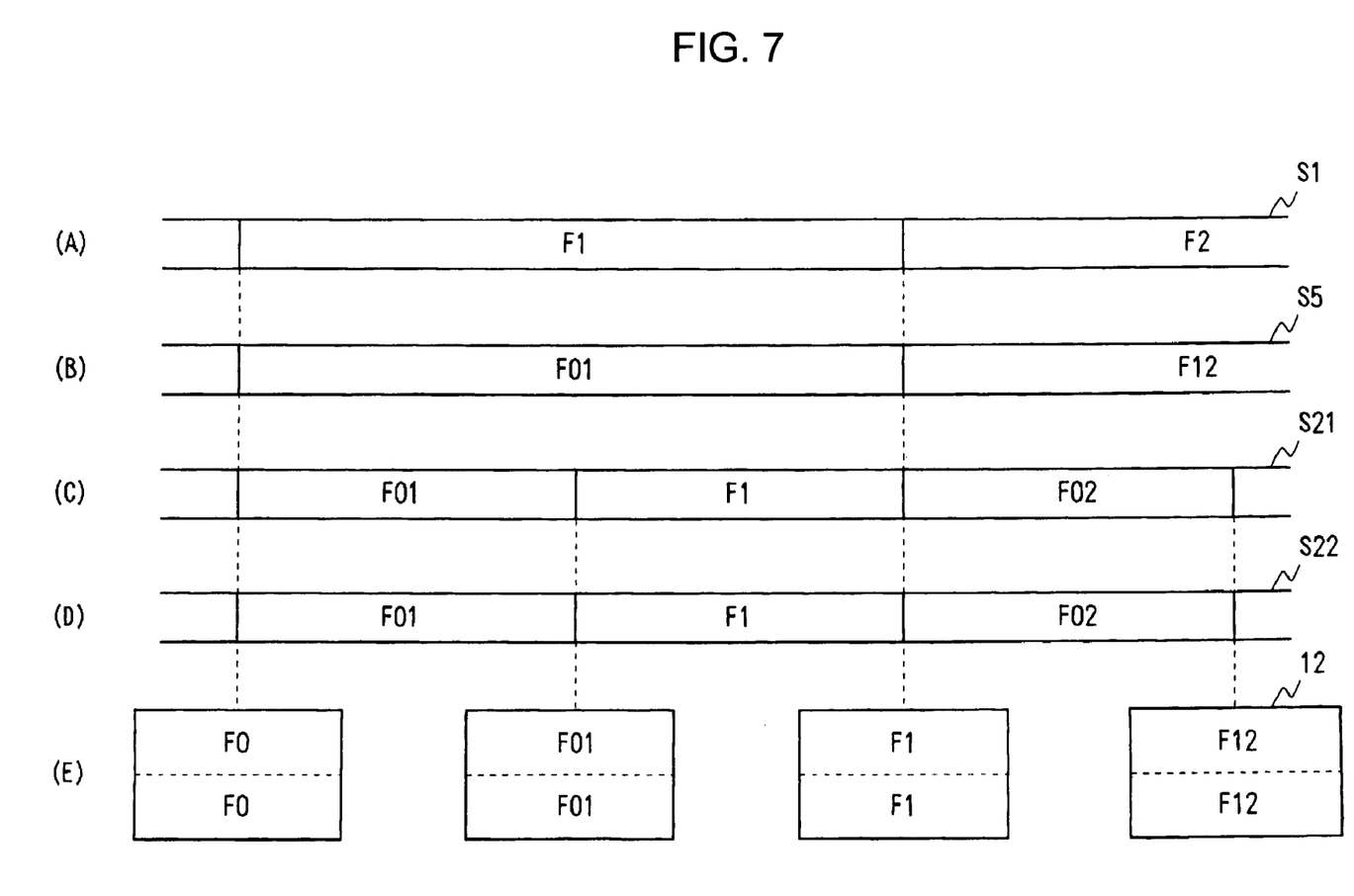
FIG. 7 is a timing chart of the case in which the video signal processing apparatus of the fourth embodiment processes an input video signal with a frame frequency of 60 Hz.

When the input video signal S1 is detected to include a motion across the boundary within the predetermined range on the basis of the determination result by the determination circuit 8, the video signals S21 and S22 as those shown in FIGS. 3 and 4 are output. In contrast, when no motion is detected across the boundary within the predetermined range, as shown in FIGS. 6 and 7 in contrast to FIGS. 3 and 4, the video signals S21 and S22 in the same frame are output to the two associated areas AR1 and AR2.

According to the fourth embodiment, only when the motion at the boundary is discontinuous, the timing of two video signals is made different from one another. Accordingly, a failure due to motion discontinuity compensation is effectively avoided, while only a discontinuous motion is prevented, thereby achieving similar advantages as those in the first embodiment.

Fifth Embodiment

Figure 8:
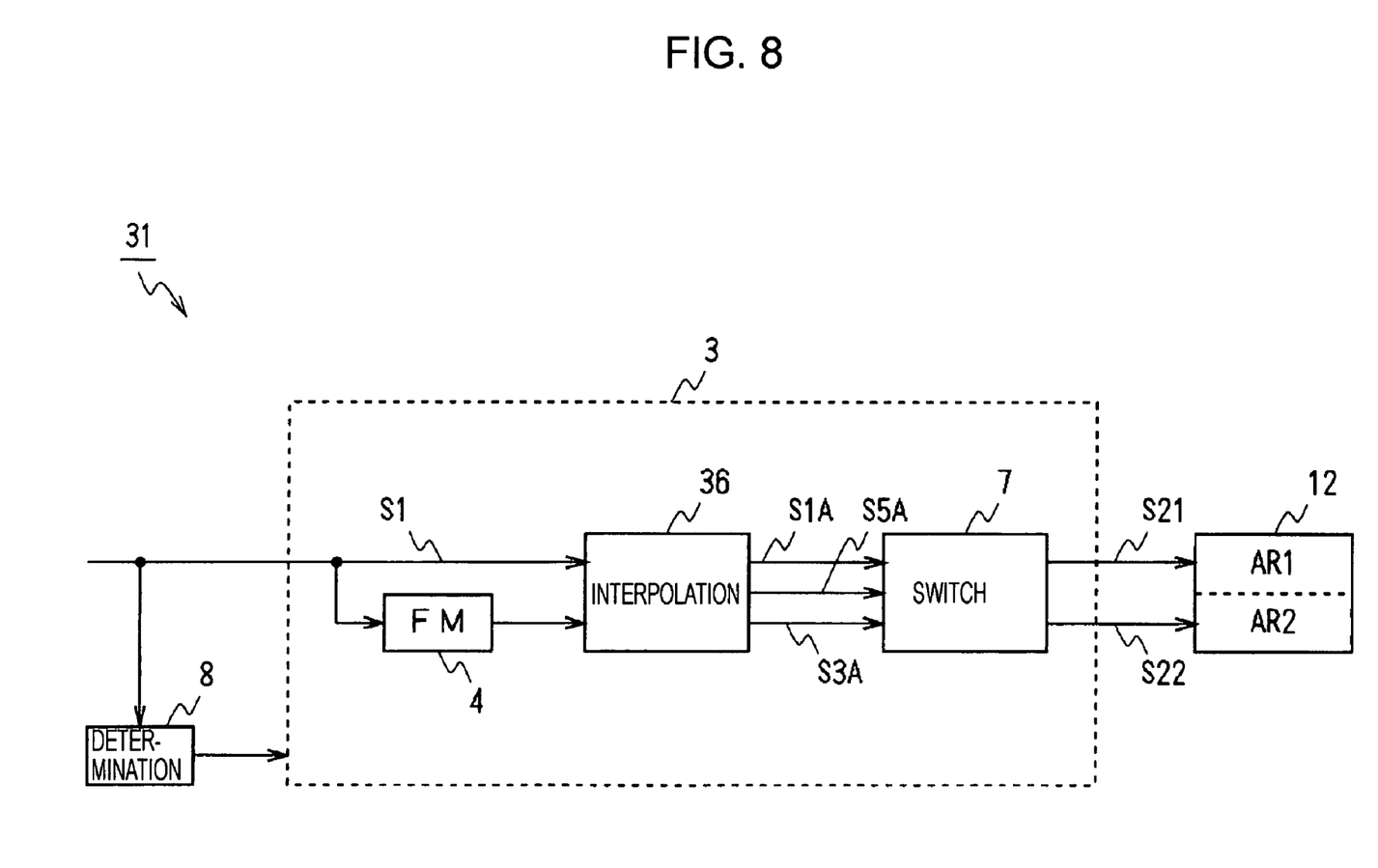
FIG. 8 is a block diagram of a video signal processing apparatus according to a fifth embodiment of the present invention.

FIG. 8 is a block diagram of a video signal processing apparatus according to a fifth embodiment of the present invention. A video signal processing circuit 31 has the same configuration as that of the above-described video signal processing apparatus 1 of the first embodiment except for the configuration of an interpolation circuit 36. In FIG. 8, the same parts as those of the video signal processing apparatus 1 are designated by the same reference numerals, and repeated descriptions thereof are omitted.

In the video signal processing circuit 31, the interpolation circuit 36 generates, on the basis of the video signal S1, video signals S1A, S3A, and S5A having the same frame frequency as that in the first embodiment by sequentially delaying the video signal S1 by one frame. The switching circuit 7 selectively outputs the video signals S1A, S3A, and S5A, thereby displaying the video signal S1 with a high resolution in accordance with various characteristics of the display 12 and avoiding discontinuity of an image at the boundary between the areas AR1 and AR2 of the display 12.

The interpolation circuit 36 performs interpolation with parameters set to the vertical positions of lines of the display 12, thereby generating the video signals S1A, S3A, and S5A. Thus, the interpolation circuit 36 generates the video signals S1A, S3A, and S5A with timing corresponding to the point at which each line is driven.

More specifically, the value n denotes the number of all lines of the display 12. To the top line, the interpolation circuit 36 outputs the input video signal S1 as the video signal S1A. To the second line, the interpolation circuit 36 performs interpolation on the interpolation point set to the point at which successive frames F1 and F2 of the video signal S1 are internally divided by $(2-1)/(n-1)$, thereby outputting the video signal S1A. To the third line, the interpolation circuit 36 similarly performs interpolation on the interpolation point set to the point at which the frames F1 and F2 are internally divided by $(3-1)/(n-1)$, thereby outputting the video signal S1A. Such interpolation processing is similarly performed for the other video signals S3A and S5A.

By generating video signals by interpolation with parameters set to the vertical positions of lines, as in the fifth embodiment, a video signal can be displayed as an even smoother image with a high resolution.

Sixth Embodiment

Although the cases in which the input video signals with frame frequencies of 120 Hz and 60 Hz are displayed using a frame frequency of 120 Hz have been described in the above-described embodiments, the present invention is not limited thereto and is widely applicable to the case in which display is performed using a frame frequency of 180 Hz or 240 Hz.

Although the cases in which the display screen of the display serving as a display unit is vertically divided into two areas and these two areas are driven have been described in the above-described embodiments, the present invention is not limited thereto, and, if necessary, the number of division can be variously set. Instead of or in addition to dividing the display screen in the vertical direction, the display screen can be divided in the horizontal direction.

Although the cases in which the number of signals output as the video signal is set to one or two have been described in the above-described embodiments, the present invention is not limited thereto, and, if necessary, the number of signals can be variously set.

It should be understood by those skilled in the art that various modifications, combinations, sub-combinations, and alterations may occur depending on design requirements and other factors insofar as they are within the scope of the appended claims or the equivalents thereof.

What is claimed is:

1. A video signal processor for transforming an input video signal of a first frame frequency into an output video signal of a second frame frequency, the output video signal being displayed on a display unit having a clock frequency equal to the second frame frequency, the video signal processor comprising:
    a delay unit for generating a delayed input video signal from the input video signal;
    an interpolation unit for generating an interpolated frame signal from the input video signal; and
    a switching unit for generating a first output signal corresponding to a first display area of the display unit and for generating a second output signal corresponding to a second display area of the display unit other than the first display area, the first output signal being generated from the input video signal or from the input video signal and the interpolated frame signal, and the second output signal being generated from the delayed video signal or from the delayed video signal and the interpolated frame signal;
    wherein the switching unit integrates the first output signal and the second output signal into the output video signal.

2. The video signal processor of claim 1, wherein the second display area is vertically lower than the first display area.

3. The video signal processor of claim 1, wherein the first display area and the second display area equally divide an entire display area of the display unit.

4. The video signal processor of claim 1, wherein, when the clock frequency is less than the first frame frequency, the switching unit:
    selects, from the input video signal, first image data corresponding to the first display area;
    selects, from the delayed video signal, second image data corresponding to the second display area;
    extends the first image data and the second image data in time domain; and
    outputs the extended first image data as the first output signal and the extended second image data as the second output signal.

5. The video signal processor of claim 1, wherein, when the clock frequency is greater than the first frame frequency, the switching unit:
    alternately selects, from the input video signal and the interpolated frame signal, first image data corresponding to the first display area;
    alternately selects, from the interpolated frame signal and the delayed video signal, second image data corresponding to the second display area; and
    outputs the first image data as the first output signal and the second image data as the second output signal.

6. The video signal processor of claim 1, further comprising a determination unit for determining the first frame frequency.

7. A video signal processing apparatus, comprising the video signal processor of claim 1, and the display unit coupled with the video signal processor.

8. A method for processing an input video signal of a first frame frequency into an output video signal of a second frame frequency to be displayed on a display unit having a clock frequency equal to the second frame frequency, the method comprising:
    delaying the input video signal to generate a delayed input video signal;
    interpolating the input video signal to generate an interpolated frame signal;
    generating a first output signal from the input video signal or from the input video signal and the interpolated frame signal, the first output signal corresponding to a first display area of the display unit;
    generating a second output signal from the delayed video signal or from the delayed video signal and the interpolated frame signal, the second output signal corresponding to a second display area of the display unit other than the first display area;
    integrating the first output signal and the second output signal into an output video signal; and
    displaying the output video signal on the display unit.

* * * * *

UNITED STATES PATENT AND TRADEMARK OFFICE
CERTIFICATE OF CORRECTION

| | | |
|---|---|---|
| PATENT NO. | : 7,626,601 B2 | Page 1 of 1 |
| APPLICATION NO. | : 11/481063 | |
| DATED | : December 1, 2009 | |
| INVENTOR(S) | : Toru Nishi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this
Eighth Day of March, 2011

David J. Kappos
*Director of the United States Patent and Trademark Office*